Patented Mar. 2, 1954

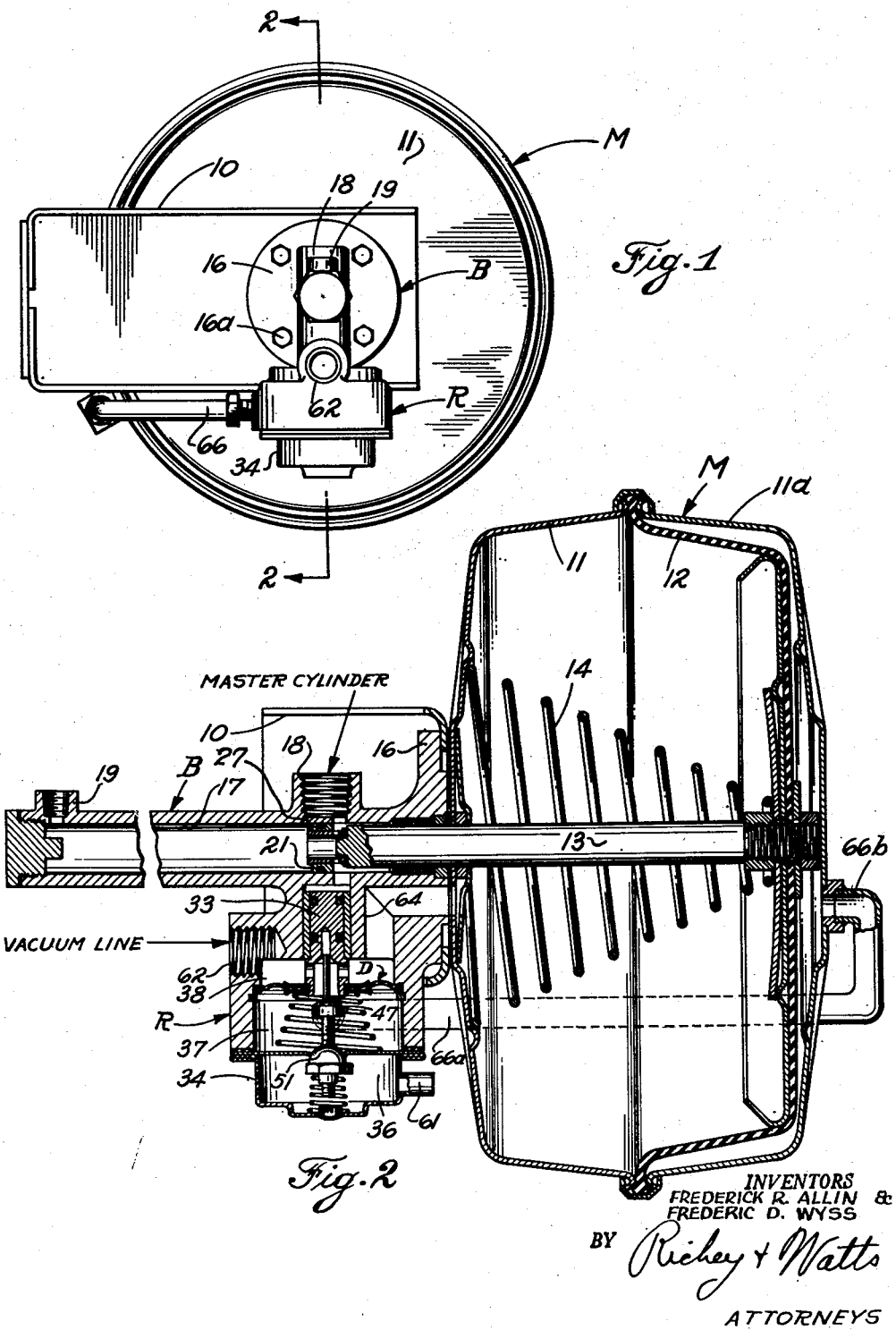

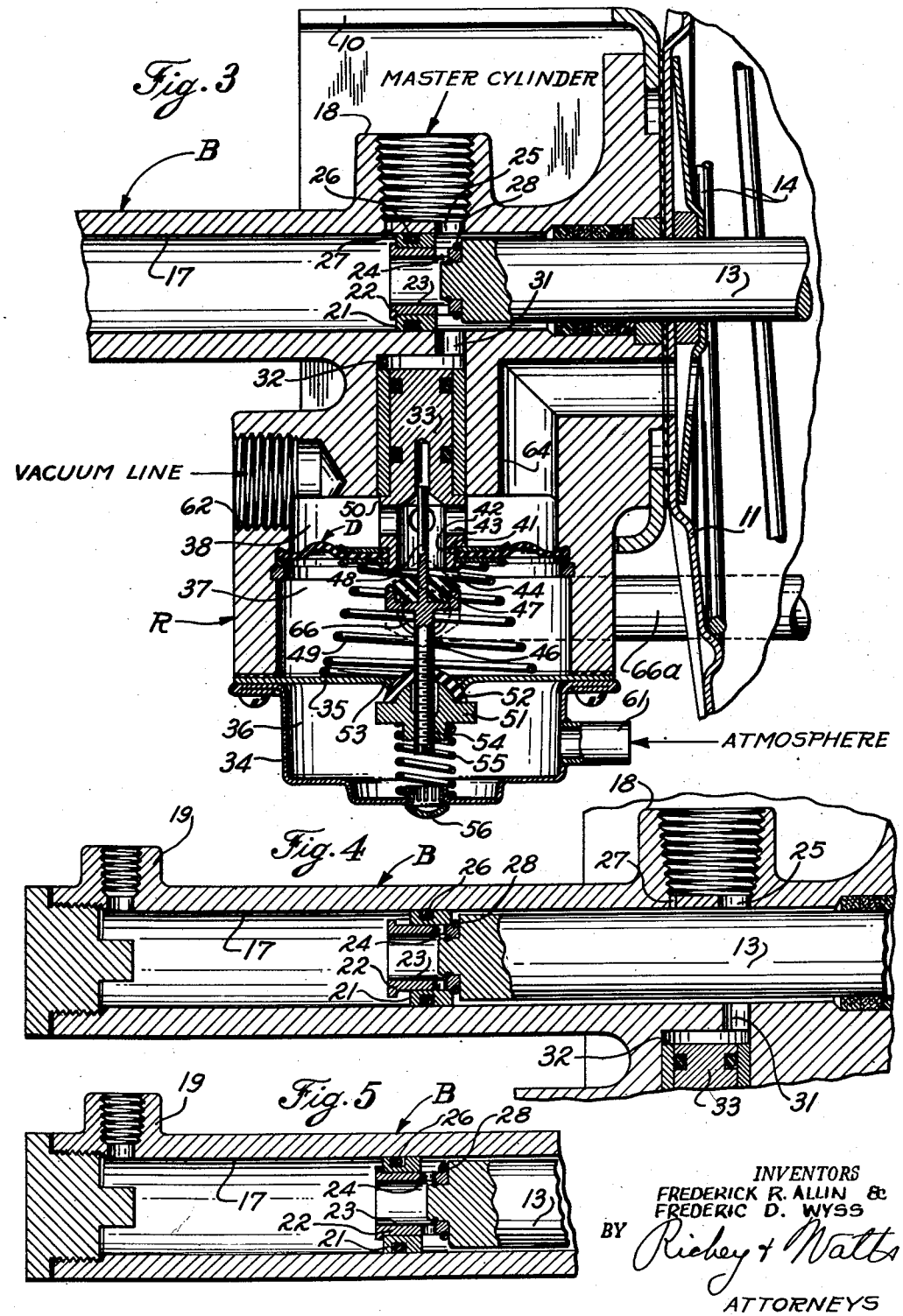

2,670,603

UNITED STATES PATENT OFFICE 2,670,603

AIR-OPERATED HYDRAULIC BRAKE BOOSTER UNIT

Frederick R. Allin, Euclid, and Frederic D. Wyss, Cleveland Heights, Ohio, assignors to The Weatherhead Company, Cleveland, Ohio, a corporation of Ohio Application June 16, 1948, Serial No. 33,347

3 Claims. (Cl. 60—54.5)

This invention relates to booster units for hydraulic brakes and, more particularly, to booster units including an air-operated motor unit fortifying the pedal pressure in a hydraulic brake system.

An object of the invention is to simplify the booster and regulator assembly, reduce its weight, eliminate dangers of leakage in the hydraulic and air or vacuum lines, and reduce the number of connections that must be made when installing the system. Briefly, this is accomplished by forming the regulator housing and hydraulic booster cylinder as an integral unit and providing cored or drilled passageways internally of those parts which form a hydraulic connection between the booster cylinder and the regulator control plunger, and a vacuum connection between the regulator and the air-operated booster motor.

Another object resides in assuring that the slack in the brake system will be taken up upon initial application of the brake pedal before the regulator controlling the booster motor operaates to initiate the booster action.

Another object is to reestablish direct communication between the master and brake cylinders in case the air-operated booster advances the hydraulic booster piston partially into the cylinder and then stops due to vacuum failure or for any other reason. This is accomplished by providing a valve that closes off communication between the master and brake cylinders during normal advance of the booster piston by the air-operated booster unit, which valve may be open to reestablish communication in case sufficient pressure is generated in the master cylinder by application of the pedal.

The manner in which these and other objects are accomplished in a preferred embodiment of our invention will appear as the following detailed description of such embodiment proceeds.

In the drawings:

Fig. 1 is a front elevation of the booster unit;

Fig. 2 is a longitudinal section therethrough taken on 2—2 of Fig. 1;

Fig. 3 is an enlarged fragmentary section like that of Fig. 2;

Fig. 4 is a fragmentary section showing the normal operation with the booster piston advanced partly into the booster cylinder by the air-operated motor; and Fig. 5 is a section like Fig. 4 showing communication between the master and brake cylinders reestablished.

The booster unit includes a hydraulic booster cylinder B and an integral regulator unit R attached to the air-operated booster motor M. A bracket 10 is fastened to the flange 16 by suitable fasteners 16a that also mount the two sheet metal cylinder elements 11 and 11a, it being understood that construction details for mounting bracket and cylinder elements form no part of the invention and may be modified in accordance with established practices. As is common in such units, a central diaphragm 12 may be provided to act as a piston element for the air-operated booster, the diaphragm being connected in the usual manner to the hydraulic piston booster rod 13. A return spring 14 is provided in accordance with conventional practice.

Booster cylinder B has a cylinder wall 17 and has inlet port 18 for connection to the master cylinder and outlet port 19 for connection to the wheel cylinders. A sliding combined piston and valve member 21 forms part of the hydraulic booster piston assembly, the rod 13 being necked down as at 22 to receive the piston and valve member. The terminal portion of the piston rod 13 is hollow as at 23 and ported as at 24 for communication with an inlet port 25 in the wall of the booster cylinder leading from the master cylinder. The piston valve member 21 is sealed with the wall 17 of the booster cylinder as at 26. Small port 27 may be provided to bleed air from the booster cylinder when the brakes are released. A sealing member 28 surrounds a portion of the piston rod for sealing the joint between the piston valve member 21 and the piston rod when the piston rod 13 is advanced by force of the air booster element.

In order to cause regulator actuation, a port 31 leads from the booster cylinder behind the piston valve member 21 and communicates with a control cylinder in the regulator housing, which may be formed by a liner element 32 pressed into a bore in the housing. Control plunger 33 slides within the liner 32 and is responsive to pressures generated in the master cylinder when the brake pedal is depressed. Below the regulator housing R is attached an air bonnet 34 and a partition 35 which cooperate to form an air chamber 36 in the regulator. A control pressure chamber 37 is formed within the regulator housing by means of partition 35 and a control diaphragm D. A vacuum chamber 38 is formed in the upper portion of the housing bounded by the diaphragm D. The terminal portion of plunger 33 is flanged over as at 41 to provide fluid-tight joint with the diaphragm assembly. The plunger 33 is bored as at 42 and ported as at 43 to establish communication between the control chamber 37 and the vacuum chamber 38. The lower portion of the plunger is formed to provide a valve seat 44, and stem 46 is formed to carry a rubber valve button 47 for closing off the vacuum port 44. Pilot stem 48 may slide within a suitable bore in plunger 33 to assist in guiding the vacuum valve 47 relative to its seat.

An air valve 51, which has the rubber-like valve button 52, is formed for cooperation with the valve seat 53 in the partition 35 between the air and vacuum chambers. The valve stem 46 may be threaded as at 54 into the valve 51 so that the axial spacing of the vacuum valve 47 and the air valve 51 may be adjusted. A control or regulator spring 49 urges the diaphragm and vacuum valve seat 44 away from the vacuum valve 47 until stop means 50 on the plunger engages the regulator housing. The air valve is urged against its seat 53 by a spring 55 and a plug 56 may be removed to give access to the adjusting screw 54.

The three chambers of the regulator are connected as follows:

The air chamber 36 is open to atmosphere at all times by means of port 61 which may be connected to an air filter in the usual manner;

The control chamber 37 in the embodiment illustrated is connected to the rear side 11a of the air motor by means of lines 66, 66a and 66b;

The vacuum chamber 38 is connected to the vacuum source, such as the engine manifold, by means of a port 62, and in the embodiment illustrated a passageway 64 cored or bored in the housing leads directly to the side 11 of the air motor.

In the embodiment illustrated, a vacuum-suspended booster unit is disclosed. The drawings show the regulator with the brakes in the released position. Under these circumstances, the booster piston is retracted and direct communication is had between the master and brake cylinders and between the master cylinder and the control plunger 33.

When the brake pedal is depressed, fluid under pressure is transmitted to the brake cylinders to take up the slack in the system. This same pressure is transmitted to plunger 33 by means of bore 31, but due to the spacing of the diaphragm seat 44 from the vacuum valve 47, even though the plunger 33 moves somewhat against the spring 49, the vacuum valve remains open and vacuum is applied to both sides of the diaphragm 12. Further application of pedal pressure acts against plunger 33 with sufficient force to bring seat 44 against the vacuum valve and close off the vacuum line or source from pipe 66 leading to the booster unit. The vacuum source remains connected to the forward side of the booster unit by means of internal passageway 64. This is the lapped position because the air valve 51 remains closed under action of the spring 55 to seal the air chamber 36 from the control chamber 37. A slight additional pedal force opens the air valve 51 and admits air to the line 66 causing motion of the booster piston rod 13.

When air valve 51 is open pressure increases in control chamber 37 and reacts against the diaphragm D, and since there is vacuum above the diaphragm plunger 33 transmits a response or "feel" back to the pedal. After the booster piston rod 13 moves a short distance, seal 28 abuts the piston valve member 21 and carries it past the bleed port 27 thereby forming a closed chamber between the piston assembly and the wheel cylinders. If pedal pressure is maintained, the air booster unit applies a boosted pressure to the wheel cylinders to seat the brakes, whereas if pedal pressure is relieved, the increased pressure in control chamber 37 will tend to restore the regulator to its lapped position or to the brake release position, depending upon the amount of pedal pressure maintained.

Normally in a system where connections are tight and mechanical adjustments are correct, the booster piston rod 13 need not move very far after the slack in the brake cylinders has been taken up by the master cylinder. Thus, the parts may be proportioned so that the fluid displaced by plunger 33 when the latter is moved by the increased pressure in the control chamber 37 exceeds that taken in behind the piston valve 21, thereby providing adequate response or "feel" to the pedal.

Fig. 4 shows the booster piston advanced into the cylinder with the piston valve 21 sealed against seal 28 to provide a closed chamber under boosted pressure. If, for any reason, the booster unit advanced the piston assembly into the cylinder enough to close off communication between the master and brake cylinders and then the booster unit ceased to function, control of the brakes would not be lost. By increasing the pedal pressure, the force behind the piston valve 21 could be made to exceed the force exerted ahead of it by fluid under pressure in the cylinder chamber thereby causing the piston valve to move forward and reestablish direct communication via part 24 between the master cylinder and the brake cylinders.

Similarly under the circumstances, if the booster cylinder were advanced as shown and the air pressure behind the diaphragm 12 were reduced, or the vacuum ahead of diaphragm 12 reduced due to leakage or the like, then the spring 14 and the pressure in the cylinder B would tend to cause the piston rod 13 to retract which, coupled with assistance of fluid pressure developed in the master cylinder by the pedal application would retract the piston valve 21 and open port 24 to provide for direct pedal control of the brakes.

Although I prefer that the spring 49 be installed under sufficient tension so that its force is at least equal to that needed to normally take up the slack, it may be seen that an additional factor of safety is provided because of the valve adjustment and that in case the spring 49 is not set up under adequate compression force or becomes weak, the vacuum valve can be moved closer to the air valve 51 to retard application of the booster brakes by requiring more compression of spring 49. Of course, the converse situation is likewise true, and the vacuum valve can be advanced toward the diaphragm seat 44 if required.

By forming the booster piston and regulator housings as a single body, hydraulic line 31 to the plunger 33 and vacuum passageway 64 to the booster cam may be formed within the body, eliminating fittings and connections and reducing the danger of leakage.

Having described in detail a preferred embodiment of my invention, it will be understood that various changes in the structural elements thereof may be made by those skilled in the art without departing from the spirit of the invention as defined in the appended claims.

What is claimed is:

1. A hydraulic brake booster unit comprising a hydraulic cylinder, a piston rod member extending into said cylinder for connection to a pneumatic motor, said piston rod being axially movable in said cylinder between a forward and a rearward position, said cylinder having a hydraulic fluid inlet port for connection to a pressure generator and a hydraulic fluid outlet port for connection to a brake motor, said piston rod member including a cylindrical terminal portion, an annular piston valve member slidably mounted on said terminal portion for motion between a forward and a rearward position relative to said piston rod, sealing means on said piston valve for sealing engagement with said cylinder wall, said piston valve member being disposed between said ports and forming with said cylinder and piston rod member a chamber ahead of said inlet port, a bleed passage in the upper wall of said cylinder providing fluid communication between said chamber and said fluid inlet port when said piston rod is in said rearward position, passageway means extending from the cylindrical surface of said terminal piston portion and arranged to establish communication between said inlet and outlet ports with said piston valve member in a forward position, an annular seal surrounding and engaging said cylindrical terminal portion, said annular piston valve member being slidable rearwardly on said terminal portion in response to the force resulting from pressure developed in said chamber, said piston valve member, terminal cylindrical portion, and annular seal cooperating to isolate said ports with said piston valve member in its rearward position and disposed between said bleed and said outlet port.

2. A hydraulic brake booster unit comprising a hydraulic cylinder, a piston rod member extending into said cylinder for connection to a pneumatic motor, said piston rod being axially movable in said cylinder between a forward and a rearward position, said cylinder having a hydraulic fluid inlet port for connection to a pressure generator and a hydraulic fluid outlet port for connection to a brake motor, said piston rod member including a cylindrical terminal portion of reduced diameter and forming a rearward shoulder, an annular piston valve member slidably mounted on said terminal portion for motion between a forward and a rearward position relative to said piston rod, sealing means on said piston valve for sealing engagement with said cylinder wall, said piston valve member being disposed between said ports and forming with said cylinder and piston rod member a chamber ahead of said inlet port, a bleed passage providing fluid communication between said chamber and said fluid inlet port when said piston rod is in said rearward position, passageway means extending from the cylindrical surface of said terminal piston portion and arranged to establish communication between said inlet and outlet ports with said piston valve member in a forward position, an annular seal of rubber-like material surrounding and engaging said cylindrical terminal portion and said shoulder, said annular piston valve member being slidable rearwardly on said terminal portion in response to the force resulting from pressure developed in said chamber to engage said annular seal and isolate said ports with said piston valve member disposed between said bleed and said outlet port, the axial force developed by said pressure in said chamber acting on said piston valve when said valve is in said rearward position relative to said piston rod urging said piston rod toward the rearward position of said piston rod during the entire range of piston rod movement.

3. A hydraulic brake unit comprising a hydraulic cylinder, a piston rod extending into said cylinder and movable axially relative thereto between a forward and a rearward position, said cylinder having a hydraulic fluid inlet port for connection to a fluid source and a hydraulic fluid outlet port for connection to a brake motor, said piston rod member including a cylindrical terminal portion, an annular piston valve member slidably mounted on said terminal portion for motion between a forward and a rearward position relative to said piston rod, sealing means on said piston valve for sealing engagement with said cylinder wall, said piston valve member being disposed between said ports and forming with said cylinder and piston rod member a chamber ahead of said inlet port, a bleed passage in the upper wall of said cylinder providing fluid communication between said chamber and fluid inlet port when said piston rod is in said rearward position, passageway means extending from the cylindrical surface of said terminal piston portion and arranged to establish communication between said inlet and outlet ports with said piston valve member in a forward position, an annular seal surrounding and engaging said cylindrical terminal portion, said annular piston valve member being slidable rearwardly on said terminal portion in response to the force resulting from pressure developed in said chamber, said piston valve member, terminal cylinder portion, and annular seal cooperating to isolate said ports with said piston valve member in its rearward position and disposed between said bleed and said outlet port.

FREDERICK R. ALLIN.
FREDERIC D. WYSS.

References Cited in the file of this patent

UNITED STATES PATENTS

| Number | Name | Date |
|---|---|---|
| 1,889,269 | Woodbury | Nov. 29, 1932 |
| 1,943,886 | Carroll | Jan. 16, 1934 |
| 2,260,492 | Stelzer | Oct. 28, 1941 |
| 2,284,935 | White | June 2, 1942 |
| 2,383,682 | Price | Aug. 28, 1945 |
| 2,393,524 | Fant | Jan. 22, 1946 |
| 2,398,811 | Stacy | Apr. 23, 1946 |
| 2,408,513 | Gunderson | Oct. 1, 1946 |
| 2,446,884 | Price | Aug. 10, 1948 |
| 2,459,456 | Rockwell | Jan. 18, 1949 |
| 2,479,232 | Gunderson | Aug. 16, 1949 |
| 2,541,312 | Vogel | Feb. 13, 1951 |

FOREIGN PATENTS

| Number | Country | Date |
|---|---|---|
| 140,878 | Great Britain | Apr. 8, 1920 |